Aug. 13, 1929.   C. DAVIDSON   1,724,566
TELEPHOTO CAMERA
Filed May 23, 1927   2 Sheets-Sheet 2

INVENTOR
Clinton Davidson
BY
White, Prost & Fryer
his ATTORNEYS

Patented Aug. 13, 1929.

1,724,566

UNITED STATES PATENT OFFICE.

CLINTON DAVIDSON, OF SAN FRANCISCO, CALIFORNIA.

TELEPHOTO CAMERA.

Application filed May 23, 1927. Serial No. 193,454.

My invention relates to telephoto cameras and particularly is pertinent to means for converting a standard camera into a telephoto camera.

At present, standard cameras are generally converted into telephoto cameras by the attachment of a special telephoto lens system. The lens system replaces the standard lens of the camera and is contained in a telescopic tube for the adjustment of the two sets of lenses which ordinarily make up the system. This attachment for a standard camera is very costly as the telescopic tube must be provided, together with two sets of lenses both of an expensive type.

It is therefore an object of my invention to provide a telephoto attachment for a standard camera which is relatively inexpensive.

Another object of my invention is to provide a telephoto attachment for a standard camera which will use the standard lenses in the conversion.

A further object of my invention is to provide a telephoto attachment for a standard camera which utilizes the normal focusing adjustment of the camera.

An additional object of my invention is to provide a telephoto attachment for a standard camera in place of the usual plate holder and which also makes use of the plate holder.

My invention possesses other advantageous features, some of which with the foregoing will be set forth at length in the following description where I shall outline in full that form of the telephoto camera of my invention which I have selected for illustration in the drawings accompanying and forming part of the present specification. In said drawings, I have shown one form of the telephoto camera embodying my invention, but it is to be understood that I do not limit myself to such form since the invention as set forth in the claims, may be embodied in a plurality of forms.

Figure 1:
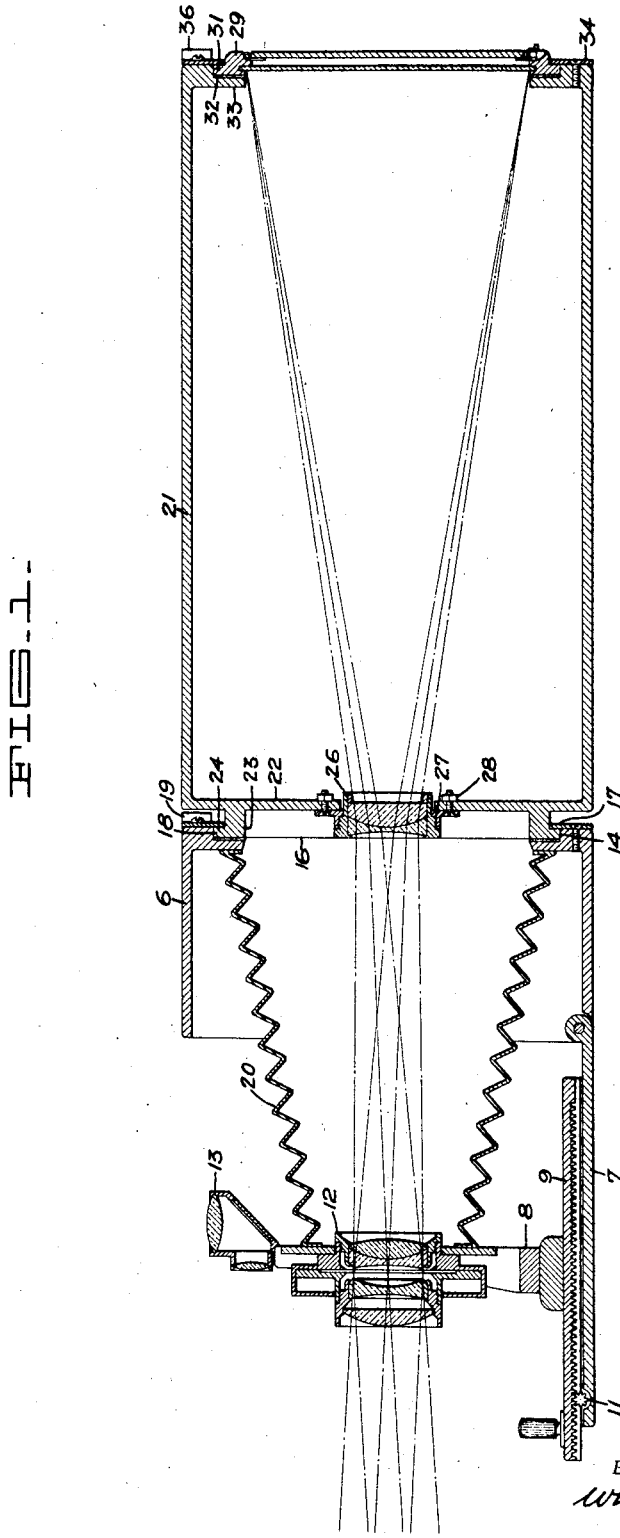
Fig. 1 is a longitudinal section of the telephoto camera of my invention.
Figure 2:
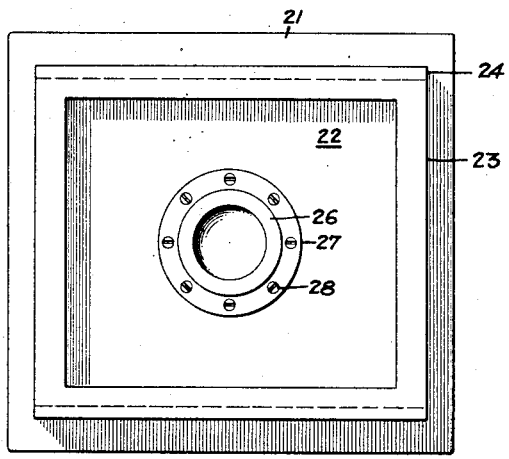
Fig. 2 is an end view of the chamber at the portion carrying the negative lens.

The telephoto camera of my invention preferably comprises a chamber adapted to be attached to a standard camera in the normal position of the plate holder and carrying a negative lens for producing an image upon the usual plate holder in turn attached to the chamber.

While my invention is applicable to a number of different types of cameras, for convenience in illustration I have shown it as attached to an adjustable focus camera of the ordinary kind. The standard camera usually comprises a casing 6 having a hinge cover 7 adapted to close the casing when the camera is not in use and to be opened to lie perpendicular to the casing when the camera is to be used. Mounted on the cover 7 is a lens standard 8 which can be advanced and retracted thru the medium of an attached rack 9 meshing with a pinion 11 journaled in the cover 7. Rotation of the pinion 11 in either direction moves the lens standard 8 in a corresponding direction and adjusts the focus. Mounted on the lens standard 8 is the lens unit 12 of the camera. This comprises preferably a corrected lens for ordinary use and also includes the usual mechanism such as the shutter. A finder 13 is conveniently mounted on the lens standard for use in adjusting the camera.

Figure 3:
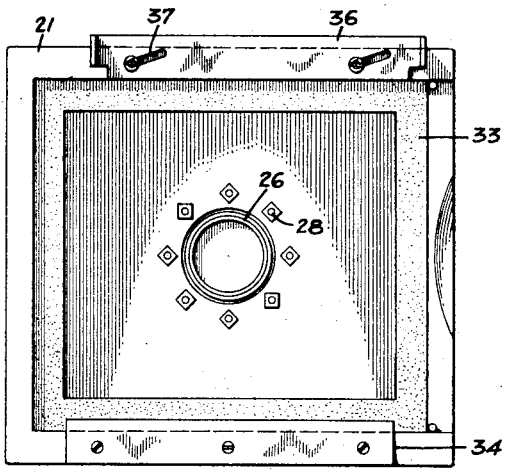
Fig. 3 is an end view of the chamber at the end carrying the plate holder.

At the rear of the casing 6, a plate holder is usually secured and is removably retained in place. The casing is rabbeted, as at 14, around the periphery of a central aperture 16. A flange 17, preferably of metal, is permanently secured to the rear of the casing 6 and overlies the rabbet to form a channel into which a tongue 18 on the plate holder fits. A slidable flange 19 is secured to the upper side of the casing 6 and can be moved to close a channel over the rabbet 14 or to release the tongue from the casing 6. This device is similar to that shown in Fig. 3. A collapsible bellows 20 connects the lens standard 8 with the casing 6 encompassing the aperture 16, so that the lens standard can be focused with relation to the plate holder without admitting extraneous light.

Ordinarily the lens unit 12 is replaced by a special telephoto lens system when it is desired to convert the camera into a telephoto camera, but I provide means for using the standard lens unit 12 and provide an attachment to the standard camera to convert it into a telephoto camera.

I preferably provide a light proof chamber 21 adapted to be attached in place of the plate holder on the standard camera. This chamber comprises a forward wall 22 having a collar 23 thereon which corresponds generally in contour to the shape of aperture 16. On the collar 23 is a flange 24 adapted to be seated in the channel formed by the rabbet 14 and to be removably secured in place by the flanges 17 and 18 in the same manner that the ordinary plate holder is held. Mounted in the forward wall 22 in focal alinement with the lens unit 12 is a negative lens 26. This lens is simple and inexpensive and is held in a frame 27 suitably secured by screws and nuts 28 to the forward wall. It cooperates with the properly adjusted lens 12 to produce an image at the opposite end of the light proof chamber 21 which normally is closed by the same plate holder 29 which has been removed from the standard camera.

The plate holder is provided with a rim 31 seating in a groove 32 formed in the rear wall 33 of the chamber 21 and is held in position by a permanently affixed metallic flange 34 and a movable flange 36 transversely displaceable to release or to secure the plate holder 29. Transverse motion of the sliding flange 36 raises and lowers it by means of inclined slots 37 provided therein and lifts the flange so that the entire plate holder can easily be removed from the chamber or can be clamped firmly in place.

While I have described my attachment as being particularly adapted to replace a plate holder on a standard camera and also as being adapted to utilize the removed plate holder, it can equally well be used with cameras operating with roll films or film packs. It will be appreciated that with my invention, a very inexpensive negative lens 26 and an inexpensive light proof chamber are provided in place of the complex and costly telephoto lens ordinarily required and that the adjustability of the standard camera is employed to replace the telescopic adjustment of the present devices. The standard lens unit is not removed but is also utilized to aid in making a quick simple change to either type of camera.

I claim:

1. A telephoto camera comprising a chamber, means at one end of said chamber for removably receiving a sensitized sheet, a negative lens fixed in the opposite end of said chamber, and means on the lens end of said chamber for removably attaching a standard camera to said chamber with the lens on said camera, said negative lens, and said sensitized sheet in focal alinement.

2. A telephoto camera comprising a light proof chamber, means at one end of said chamber for the attachment of a plate holder from a standard camera, means at the opposite end of said chamber for the attachment of said chamber in place of the plate holder of a standard camera, and a negatitve lens on said chamber adapted to cooperate with said standard camera to produce an image on said plate holder.

3. An attachment for converting a standard camera having a lens and a removable sensitized surface holder into a telephoto camera, comprising a chamber adapted to be secured to the standard camera in place of said holder, a lens fixed in said chamber and adapted to cooperate with said camera lens to produce a telephoto image and means for supporting a sensitized surface holder in the plane of said image.

In testimony whereof, I have hereunto set my hand.

CLINTON DAVIDSON.